United States Patent
Iwasa et al.

(10) Patent No.: US 7,989,994 B2
(45) Date of Patent: Aug. 2, 2011

(54) CYLINDER-TYPE LINEAR MOTOR AND MOVING PART THEREOF

(75) Inventors: Takao Iwasa, Kashiwa (JP); Hirobumi Satomi, Kashiwa (JP)

(73) Assignee: Oriental Motor Co., Ltd., Tokyo (JP)

( * ) Notice: Subject to any disclaimer, the term of this patent is extended or adjusted under 35 U.S.C. 154(b) by 0 days.

(21) Appl. No.: 12/098,171

(22) Filed: Apr. 4, 2008

(65) Prior Publication Data

US 2008/0246352 A1    Oct. 9, 2008

Related U.S. Application Data

(62) Division of application No. 11/197,014, filed on Aug. 4, 2005, now Pat. No. 7,378,765.

(30) Foreign Application Priority Data

| Aug. 9, 2004 | (JP) | 2004-231993 |
| Sep. 1, 2004 | (JP) | 2004-253765 |
| Sep. 1, 2004 | (JP) | 2004-253766 |

(51) Int. Cl.
*H02K 41/02* (2006.01)
*H02K 41/03* (2006.01)
*H02K 33/00* (2006.01)

(52) U.S. Cl. .......................... 310/14; 310/15
(58) Field of Classification Search .............. 310/12, 310/14–17
See application file for complete search history.

(56) References Cited

U.S. PATENT DOCUMENTS

| 3,202,886 | A | * | 8/1965 | Kramer ..................... 335/234 |
| 4,363,980 | A | | 12/1982 | Petersen |
| 4,460,855 | A | | 7/1984 | Kelly |
| 4,541,787 | A | | 9/1985 | DeLong |
| 4,870,306 | A | * | 9/1989 | Petersen ..................... 310/12 |
| 4,924,123 | A | * | 5/1990 | Hamajima et al. ......... 310/15 |
| 4,965,864 | A | | 10/1990 | Roth et al. |
| 5,231,336 | A | | 7/1993 | van Naemen |
| 5,270,631 | A | | 12/1993 | Takahashi et al. |
| 5,345,206 | A | | 9/1994 | Morcos |
| 5,434,549 | A | * | 7/1995 | Hirabayashi et al. ......... 335/229 |
| 5,440,183 | A | | 8/1995 | Denne |
| 5,602,431 | A | | 2/1997 | Satomi et al. |
| 5,734,209 | A | | 3/1998 | Hallidy |
| 5,872,407 | A | | 2/1999 | Kitaoka et al. |
| 5,896,076 | A | * | 4/1999 | van Namen ..................... 335/229 |
| 5,952,743 | A | | 9/1999 | Sidey |
| 6,043,572 | A | | 3/2000 | Nagai et al. |
| 6,157,100 | A | * | 12/2000 | Mielke ..................... 310/13 |

(Continued)

FOREIGN PATENT DOCUMENTS

JP    59-59064    4/1984

(Continued)

*Primary Examiner* — Burton Mullins

(74) *Attorney, Agent, or Firm* — Myers Bigel Sibley & Sajovec, P.A.

(57) ABSTRACT

The present invention provides a cylinder-type linear motor capable of shortening the total motor length with respect to a predetermined stroke length and capable of being operated as a brushless DC motor without a sensor means for sensing the position of a moving part being added in the axial direction. The present invention also provides a moving part of said cylinder-type linear motor, which can improve the magnetic flux density distribution waveform near both end portions of the moving part assembly and can improve the thrust characteristic by bringing the magnetic flux density distribution waveform closer to a cosine waveform and by increasing the amplitude of cosine waveform.

8 Claims, 10 Drawing Sheets

U.S. PATENT DOCUMENTS

| | | | |
|---|---|---|---|
| 6,313,551 B1 | 11/2001 | Hazelton | |
| 6,329,728 B1 * | 12/2001 | Kitazawa et al. | 310/14 |
| 6,748,907 B2 | 6/2004 | Malmquist et al. | |
| 6,770,988 B2 | 8/2004 | Denne | |
| 6,914,351 B2 * | 7/2005 | Chertok | 310/12 |
| 6,917,136 B2 * | 7/2005 | Thornton et al. | 310/254 |
| 7,205,686 B2 | 4/2007 | Okubo | |
| 7,474,018 B2 * | 1/2009 | Shimizu et al. | 310/12 |
| 2004/0263003 A1 | 12/2004 | Jack et al. | |
| 2006/0226713 A1 | 10/2006 | Lehr et al. | |

FOREIGN PATENT DOCUMENTS

| | | | |
|---|---|---|---|
| JP | 62-118755 | * | 5/1987 |
| JP | 63-283491 | | 11/1988 |
| JP | 05-015139 | | 1/1993 |
| JP | 7-107732 A | | 4/1995 |
| JP | 8-116658 | | 5/1996 |
| JP | 11-332211 | | 11/1999 |
| JP | 2000-139069 | | 5/2000 |
| WO | WO 2004071793 | | 8/2004 |

* cited by examiner

CYLINDER-TYPE LINEAR MOTOR AND MOVING PART THEREOF

RELATED APPLICATIONS

This application is a divisional application of U.S. application Ser. No. 11/197,014 filed on Aug. 4, 2005, now U.S. Pat. No. 7,378,765 and claims priority from Japanese Patent Application No. 2004-231993; filed Aug. 9, 2004; Japanese Patent Application No. 2004-253765; filed Sep. 1, 2004; and Japanese Patent Application No. 2004-253766; filed Sep. 1, 2004, the disclosures of which are incorporated by reference herein in their entirety.

BACKGROUND OF THE INVENTION AND RELATED ART STATEMENT

1. Field of the Invention

The present invention relates to a cylinder-type linear motor having a permanent magnet in a moving part section and a plurality of ring-shaped coils in a fixed part section, and a moving part thereof.

2. Description of Related Art

FIG. 11 is a sectional view of a two-phase cylinder-type linear motor that has been known conventionally.

In FIG. 11, a moving part 100 of the cylinder-type linear motor includes a linear motion shaft 101 reciprocating in the axial direction, a cylindrical moving part yoke 102 mounted on the linear motion shaft 101, and a plurality of ring-shaped permanent magnets 103 arranged on the outer peripheral surface of the moving part yoke 102 in a magnetized manner such as to adopt an alternate polarity with a magnetic pole pitch P in the axial direction. Also, a fixed part core 201 of a fixed part 200 has ring-shaped yoke portions 202 each having a smaller inside diameter and ring-shaped yoke portions 203 each having a larger inside diameter, both yoke portions being laminated alternately in the axial direction. As a result, on the inner peripheral surface of the fixed part 201, a large number of ring-shaped tooth portions 204 and ring-shaped groove portions 205 are formed in the axial direction with an equal pitch (P/2). In the ring-shaped groove portions 205, ring-shaped coils 206, 207, ..., 213 are disposed in the phase order of A phase and B phase. Therefore, the ring-shaped coils 206, 208, 210 and 212 disposed alternately are connected to each other to form an A-phase winding, and the remaining coils 207, 209, 211 and 213 are also connected to each other to form a B-phase winding.

An axial length M of a moving part core section is longer than an axial length K of a fixed core section, and therefore is an axial length in which the moving part and the fixed part face each other, namely, a thrust contribution length K. Also, a stroke length S is expressed by (M−K). From FIG. 11, the travel range length of the moving part is expressed by (K+2S), namely, (thrust contribution length+2×stroke length S). The total motor length is set so as to satisfy the travel range length of the moving part. As the related art, Japanese Patent Provisional Publication No. 7-107732 and Japanese Patent Provisional Publication No. 5-15139 can be cited.

OBJECT AND SUMMARY OF THE INVENTION

For the linear motor having the above-described conventional construction, in order to provide a predetermined stroke S, it is necessary to set the total length of the motor so as to satisfy the travel range length (thrust contribution length+2×stroke length S) of the moving part, which results in a problem of greater total motor length. Also, since the above-described motor having the conventional construction is of a permanent magnet type, it can be operated as a brushless DC motor in principle. For this purpose, however, sensor means for sensing the position of moving part must be provided separately so as to be adjacent to the fixed part section in the axial direction. In this case, there arises a problem in that the total motor length increases further.

In order to improve the workability in producing the fixed part, a construction is sometimes employed in which a comb teeth shaped core having a cross section equivalent to the cross section of the fixed part core shown in FIG. 11 is fitted from the outside of the ring-shaped coils. In this case, there arises a problem in that in order to change the stroke length, it is necessary to prepare a mold newly, and therefore the stroke length cannot be changed easily. Further, there also arises a problem in that it is necessary to change the length of fixed part so that the number of ring-shaped coils in windings of both phases is equal, and therefore the degree of freedom in changing the stroke length is low. Still further, there arises a problem in that when the thrust contribution length is fixed, the inertia moment of moving part increases, thereby degrading the response, as the stroke length S is increased.

The present invention has been made to solve the above problems. Accordingly, it is an object of the present invention to provide a cylinder-type linear motor in which the total motor length can be shortened with respect to a predetermined stroke length S, the linear motor can be operated as a brushless DC motor without sensor means for sensing the position of a moving part being added in the axial direction, the stroke length S can be increased/decreased easily at a low cost, the degree of freedom in changing the stroke length can be made high, and the inertia moment of moving part is not affected by the stroke length S.

Also, it is another object of the present invention to provide a moving part of a cylinder-type linear motor in which the total motor length can be shortened with respect to a predetermined stroke length S, the linear motor can be operated as a brushless DC motor without sensor means for sensing the position of a moving part being added in the axial direction, and a magnetic pole position detecting method, which has been used for the conventional brushless motor, can be adopted.

Further, it is still another object of the present invention to provide a moving part of a cylinder-type linear motor in which the total motor length can be shortened with respect to a predetermined stroke length S, the linear motor can be operated as a brushless DC motor without sensor means for sensing the position of a moving part being added in the axial direction, the magnetic flux density distribution waveform near both end portions of the moving part assembly can be improved, and the thrust characteristic can be improved by bringing the magnetic flux density distribution waveform closer to a cosine waveform and by increasing the amplitude of cosine waveform.

To solve the above problems, the present invention provides a cylinder-type linear motor including a fixed part including a coil assembly having a plurality of (n number of) ring-shaped coils arranged in the axial direction to form a cylindrical space, and a yoke member made of a magnetic material, which is provided on the outer periphery side of the coil assembly; and a moving part including a linear motion shaft provided on the axis line of the fixed part so as to be capable of reciprocating in the axial direction, and a permanent magnet assembly having one or more permanent magnets magnetized in the axial direction, which is provided on the linear motion shaft, characterized in that when the axial length of the ring-shaped coil is taken as C, the axial length of the permanent magnet assembly as M, and the outside diameter thereof as D, a stroke S is equal to or smaller than (n×C−M), the axial length Y of the yoke member is set equal to or larger than (M+S+0.8×D), and the ring-shaped coils are arranged in a predetermined phase order and the ring-shaped coils of the same phase are connected to each other to form one phase winding.

Also, in the cylinder-type linear motor in accordance with the present invention, the permanent magnet assembly of the moving part is arranged so that when the number of permanent magnets is two or more, the end faces with the same polarity face to each other.

Further, in the cylinder-type linear motor in accordance with the present invention, the yoke member is formed by a cylindrical member, an opening extending in the axial direction is provided in the cylindrical member, and sensor means for sensing the magnetic pole position of the moving part is provided in the opening.

Still further, in the cylinder-type linear motor in accordance with the present invention, the yoke member is formed by a plurality of slender plate-shaped members, these plate-shaped members are arranged at predetermined intervals in the circumferential direction so as to cover the outer peripheral surface of the coil assembly, and the coil assembly is held by the plate-shaped members.

Further, in the cylinder-type linear motor in accordance with the present invention, a plurality of groove portions parallel with the linear motion shaft are provided in the inner peripheral surface of an aluminum-made case member for radiating heat from the coils, and the yoke members are disposed in the groove portions.

Still further, in the cylinder-type linear motor in accordance with the present invention, the linear motor is driven by a driving circuit having sensor means for sensing the magnetic pole position of the moving part, which is provided in the outer peripheral surface of the coil assembly; a moving part magnetic pole position detecting section for detecting the magnetic pole position of the moving part by means of a signal from the sensor means; a memory section for storing pattern data that are set so as to correspond to the moving part magnetic pole position and to correct asymmetry of magnetic flux density distribution waveform caused by the configuration of the permanent magnet assembly and asymmetry of mating winding existing in the case where the number of ring-shaped coils is different according to the phase; a current control section in which a current command value of each phase is produced based on the pattern data read from the memory section so as to correspond to the moving part magnetic pole position and a current command from a speed control section, the current command value is compared with an actual current value sent from a current detecting section for detecting a current flowing in each phase winding, and a gate signal for carrying out PWM control is generated so that the difference is zero; and an inverter section provided with switching means that is ON/OFF controlled by the gate signal from the current control section.

The present invention provides a moving part of a cylinder-type linear motor, including a linear motion shaft which is arranged on an axis line of a cylindrical fixed part so as to reciprocate on the axis line in the axial direction; and a permanent magnet assembly which is provided on the linear motion shaft and is configured so that a plurality of permanent magnets magnetized in the axial direction are disposed so that the end faces thereof face to each other, characterized in that a unit is formed by a first permanent magnet magnetized in a first axial direction and second and third permanent magnets magnetized in the direction opposite to the first axial direction, which are arranged on both sides of the first permanent magnet; one or more units are arranged in series in the axial direction to form the permanent magnet assembly; when the first to third permanent magnets are arranged in the order of the second, first and third permanent magnets from the left, a distance between the left-hand side end face of the second permanent magnet and the right-hand side end face of the third permanent magnet is set at 2×L, and a distance between a first central position between the right-hand side end face of the second permanent magnet and the left-hand side end face of the first permanent magnet and a second central position between the right-hand side end face of the first permanent magnet and the left-hand side end face of the third permanent magnet is set at L.

Also, in the moving part of a cylinder-type linear motor in accordance with the present invention, the axial length of the first permanent magnet is L, and the axial lengths of the second and third permanent magnets each are L/2.

Further, in the moving part of a cylinder-type linear motor in accordance with the present invention, the cross-sectional areas of the second and third permanent magnets are equal to each other, and each are different from the cross-sectional area of the first permanent magnet.

Still further, in the moving part of a cylinder-type linear motor in accordance with the present invention, the energy products of the second and third permanent magnets are equal to each other, and each are different from the energy product of the first permanent magnet.

To solve the above problems, the present invention provides a moving part of a cylinder-type linear motor, including a linear motion shaft which is arranged on an axis line of a cylindrical fixed part so as to reciprocate on the axis line in the axial direction; and a permanent magnet assembly which is provided on the linear motion shaft and is configured so that a plurality of permanent magnets magnetized in the axial direction are disposed so that the end faces thereof face to each other, characterized in that the permanent magnet assembly has a pair of permanent magnets magnetized in the axial direction, which are arranged so that the end faces with the same polarity face to each other; a pair of ring-shaped fixing members each having an outside diameter smaller than the outside diameter of the paired permanent magnets, which are fixed on the linear motion shaft so as to be in contact with both sides of the paired permanent magnets; and a pair of ring-shaped permanent magnets magnetized in the radial direction so that the polarity on the outer peripheral surface is different from the polarity on the opposed end face of the paired permanent magnets, which are provided on the outer peripheral surfaces of the paired ring-shaped fixing members.

Also, in the moving part of a cylinder-type linear motor in accordance with the present invention, the ring-shaped fixing members each are made of a magnetic material.

Further, in the moving part of a cylinder-type linear motor in accordance with the present invention, a distance between central positions in the axial direction of the ring-shaped permanent magnets is set so as to be two times of a magnetic pole pitch of the moving part.

According to the present invention, since the cylinder-type linear motor is configured as described above, the travel range length of a moving part that determines a necessary total motor length can be made (thrust contribution length+stroke length S). Also, since the fixed part has no slot, a mold is not needed, the increase/decrease in stroke length does not depend on the length of the moving part, and the number of ring-shaped coils can be increased or decreased in unit of one coil. Therefore, the stroke length can be increased or decreased easily at a low cost, and the degree of freedom in changing the number of ring-shaped coils can be made high. Also, since the sensor means for sensing the position of moving part can be disposed on the outside of the ring-shaped coil, the linear motor can be operated as a brushless DC motor without increasing the axial length.

According to the present invention, the distribution waveform of radial component of magnetic flux density is a synthesis of distribution waveforms of permanent magnets constituting the permanent magnet assembly of the moving part. Therefore, by setting the distribution waveform formed by the second and third permanent magnets with respect to the distribution waveform formed by the first permanent magnet, the synthesized distribution waveform can be improved, so that a magnetic pole position detecting method, which has been used for conventional brushless motors, can be adopted.

Also, according to the present invention, since the cylinder-type linear motor is configured as described above, the travel range length of a moving part that determines a necessary total motor length can be made (thrust contribution length+ stroke length S).

According to the present invention, the magnetic flux density distribution waveform near both end portions of the moving part assembly can be improved, and the thrust characteristic can be improved by bringing the magnetic flux density distribution waveform closer to a cosine waveform and by increasing the amplitude of cosine waveform.

DETAILED DESCRIPTION OF PREFERRED EMBODIMENTS

Preferred embodiments of the present invention will now be described exemplarily and in detail with reference to the accompanying drawings.

Figure 1:
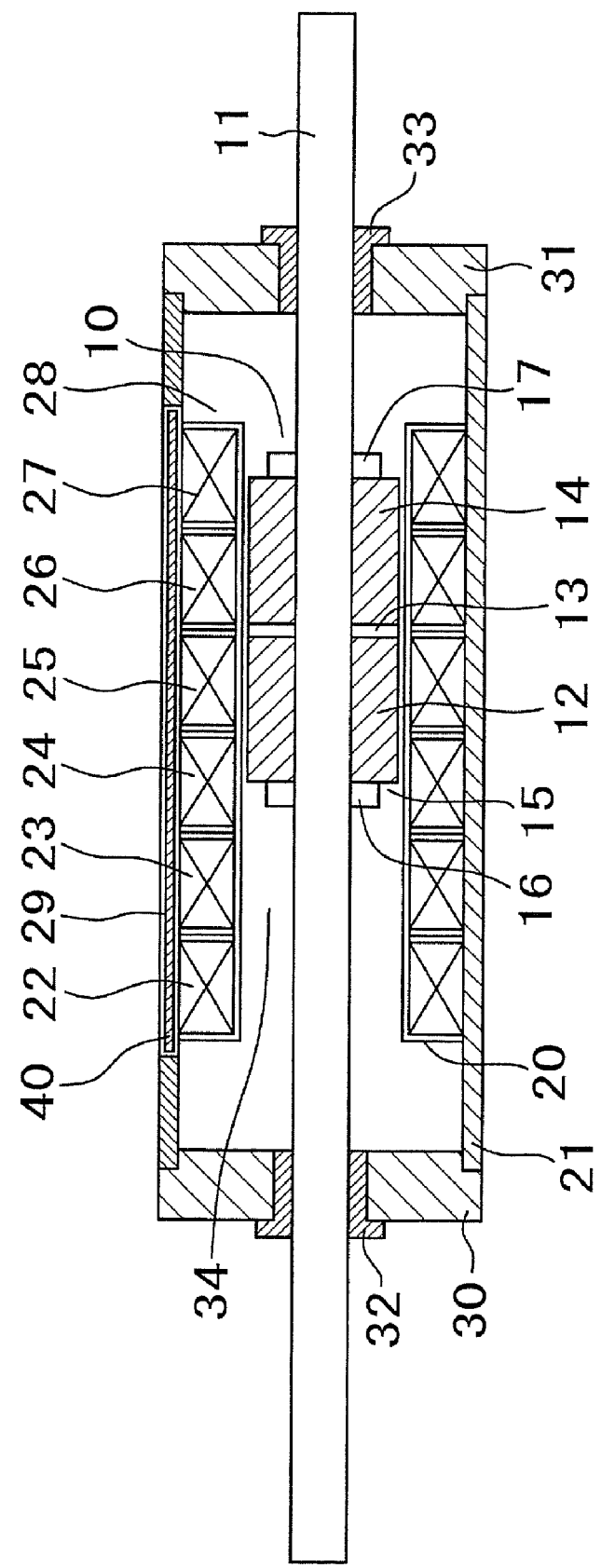
FIG. 1 is a longitudinal sectional view showing an embodiment of a cylinder-type linear motor in accordance with the present invention.
Figure 2:
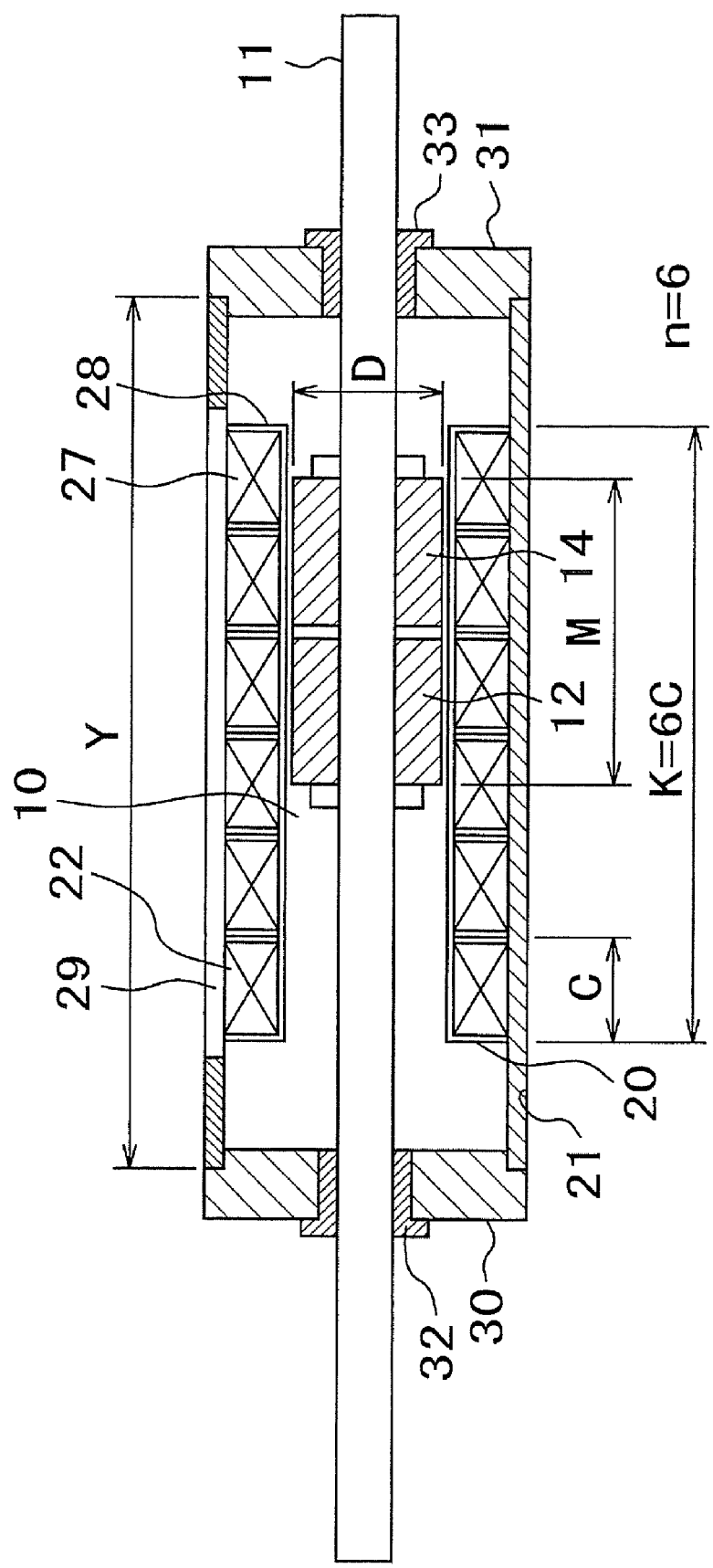
FIG. 2 is a longitudinal sectional view in which symbols designating the lengths of parts shown in FIG. 1 are shown.

FIGS. 1 and 2 are sectional views showing one embodiment of a linear motor in accordance with the present invention.

In FIGS. 1 and 2, a moving part 10 includes a linear motion shaft 11 reciprocating in the axial direction, and a permanent magnet assembly 15 in which two permanent magnets 12 and 14 magnetized in the axial direction are disposed with a spacer 13 being held therebetween so that the end surfaces thereof with the same polarity face to each other. The spacer 13 adjusts a magnetic pole pitch P (distance between the N and S poles) of the moving part 10, and also regulates a waveform (magnetic flux density distribution waveform) in which a radial component of magnetic flux density changes according to the axial position of moving part. The spacer 13 may be made of a magnetic material or may be made of a non-magnetic material. In some cases, the spacer 13 need not be used.

The permanent magnet assembly 15 is firmly fixed to the linear motion shaft 11 by fixing ring members 16 and 17 provided on both end faces of the permanent magnet assembly 15. The moving part 10 is supported in the center of a pair of brackets 30 and 31 facing to each other with a predetermined distance via bearings 32 and 33 so as to be movable in the axial direction. On the other hand, a fixed part 20 both ends of which are supported by the brackets 30 and 31 is composed of a cylindrical yoke 21 made of a magnetic material, and a coil assembly 28 having a plurality of ring-shaped coils 22, 23, . . . , 27 disposed in the axial direction with an equal pitch C. The coil assembly 28 is housed in the cylindrical yoke 21, and is formed with a cylindrical space 34 for containing the permanent magnet assembly 15 therein. Also, the cylindrical yoke 21 is provided with an opening 29 extending in the axial direction, and a circuit board 40 having sensor means 41, not shown, for sensing the magnetic pole position of the moving part 10 is installed therein. The circuit board 40 is provided with a terminal for connecting the starting end and trailing end of each of the coils, and the coils are connected by a printed circuit provided on the circuit board 40 so that the winding of each phase is formed.

Figure 3:
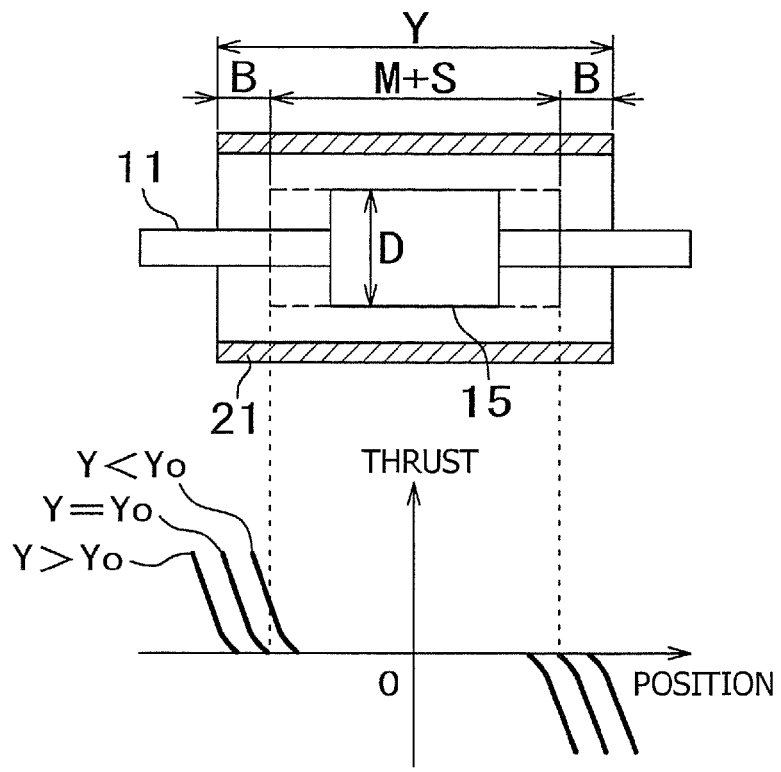
FIG. 3 is a view schematically showing the relationship of a detent thrust depending on the relationship between a travel range length of a moving part and a length of a cylindrical yoke.

FIG. 3 is a view schematically showing the relationship of a detent thrust depending on the relationship between a travel range length (M+S) of the moving part 10 and a length Y of the cylindrical yoke 21. In FIG. 3, the center in the axial direction of the permanent magnet assembly 15 is taken as an origin of position. From FIG. 3, it can be seen that a detent thrust that draws the moving part 10 into the yoke is generated near both ends of the stroke. Also, it can be seen that if the length Y of the cylindrical yoke 21 is set so as to be equal to or greater than a certain value Yo, the detent thrust can be kept at a negligible value in the travel range length (M+S) of the moving part 10. A yoke projecting dimension B at the time when Y is equal to Yo depends on the outside diameter D of the permanent magnet, and is expressed as B=kD. It is determined analytically that k is proper when it takes a value of about 0.4. Therefore, Yo=M+S+2×B=M+S+0.8×D.

From the above description, as shown in FIG. 2, when the axial length of the permanent magnet assembly 15 is taken as M, the outside diameter thereof as D, and the stroke length as S, the length Y of the cylindrical yoke 21 is set at a value equal to or larger than (M+S+0.8×D). By doing this, the detent thrust generated at both ends of stroke at the time of de-energization can be kept at a negligible value. When the pitch between the ring-shaped coils 22, 23, . . . , 27 is taken as C, since the number n of the ring-shaped coils 22, 23, . . . , 27 is six, an axial length K of the fixed part 20 is 6C. In this case, the thrust contribution length is M. Also, the stroke length S can take a value equal to or smaller than (K−M), namely, (6C−M).

In FIG. 2, the number of the ring-shaped coils 22, 23, ..., 27 is six. However, by increasing the number of the ring-shaped coils 22, 23, ... 27 to seven or decreasing to five, for example, the stroke length S can be increased or decreased with the coil pitch C being a unit to (7C−M) or (5C−M). Since the stroke length S does not depend on the length M of the permanent magnet assembly 15, it can be seen that even if the stroke length S is increased, the inertia moment of the moving part 10 does not increase. Also, since the travel range length of the moving part 10 is (thrust contribution length+stroke length S), the total motor length can be shortened by the stroke length S as compared with the conventional example.

Figure 4:
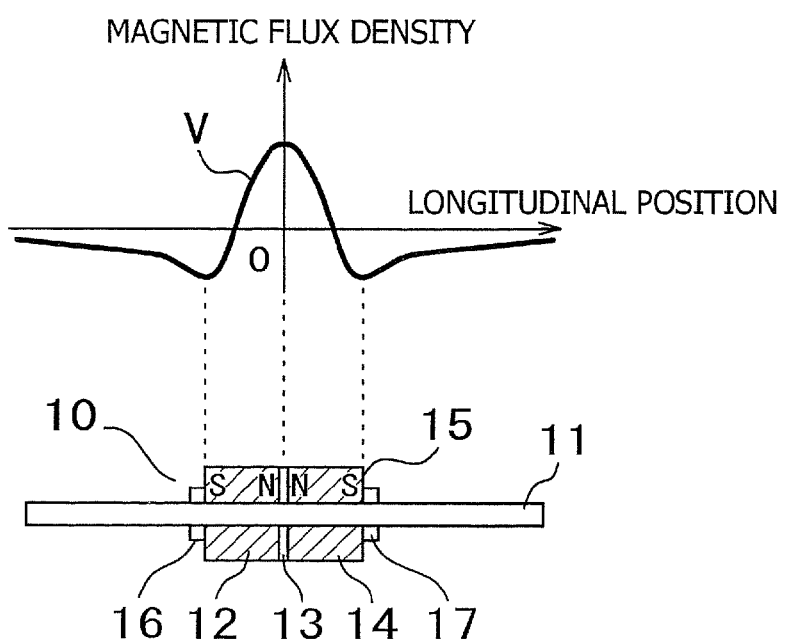
FIG. 4 is a view showing an axial distribution waveform of a radial component of magnetic flux density due to a moving part in accordance with the present invention and a permanent magnet assembly corresponding to the moving part.

FIG. 4 is a view showing an axial distribution waveform of a radial component of magnetic flux density due to the moving part 10 in accordance with this embodiment and the permanent magnet assembly 15 corresponding to the moving part 10. It can be seen that in the range of the axial length M of the permanent magnet assembly 15, the distribution waveform of magnetic flux density can be approximated as a waveform in which a DC component is added to a cosine component. Specifically, when the axial position with the axial center position of the permanent magnet assembly 15 being the origin is taken as (x), the magnetic flux density B(x) is expressed as $B(x)=B1 \times \cos(\pi x/L)+B0$, wherein L is a magnetic pole pitch of moving part. The output voltage of the sensor means 41 is also a voltage proportional to this, so that the position of the moving part 10 can be read by utilizing the same relational expression as described above.

Also, it can be seen that since the thrust is proportional to the product of counter electromotive voltage and current, and the counter electromotive voltage is proportional to a change with respect to the position of the magnetic flux density, an influence of the DC component of the magnetic flux density is eliminated.

Figure 5:
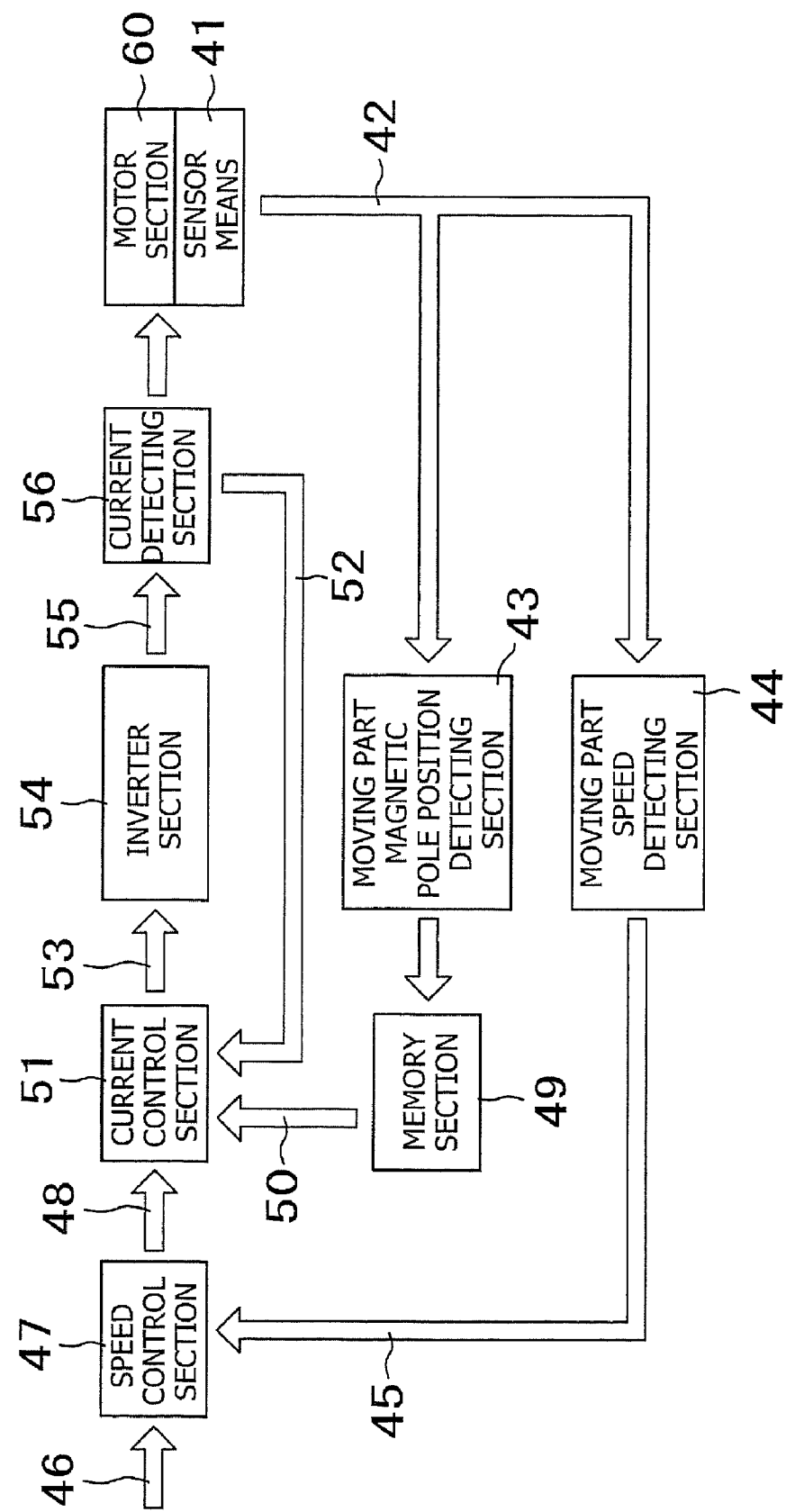
FIG. 5 is a control block diagram for illustrating the drive of a linear motor in accordance with the present invention.

FIG. 5 is a control block diagram for illustrating the drive of the linear motor in accordance with the present invention.

A signal 42 generated from the sensor means 41 incorporated in a motor section 60 is sent to a moving part magnetic pole position detecting section 43 and a moving part speed detecting section 44, where the magnetic pole position and speed of the moving part 10 are detected. Detected moving part speed data 45 and command speed data 46 are input into a speed control section 47, and a current command 48 corresponding to a difference between a command speed and an actual moving part speed is sent out of the speed control section 47. On the other hand, magnetic pole data is sent out of the moving part magnetic pole position detecting section 43, and is input into a memory section 49 that stores three-phase pattern data set corresponding to the moving part magnetic pole position. Data 50 corresponding to the moving part position is sent out of the memory section 49, and is input into a current control section 51 together with the current command 48, whereby a command value of each phase current is generated. In the current control section 51, the generated current command is compared with actual each phase current value 52 detected by a current detecting section 56, and a gate signal 53 for carrying out PWM control is generated so that the difference is zero. The gate signal 53 controls ON/OFF of switching means of an inverter section 54, whereby control is carried out so that each phase current waveform of the motor section 60 takes a predetermined value. The memory section 49 stores the aforementioned three-phase pattern data considering the correction of asymmetry of magnetic flux density distribution waveform caused by the configuration of the permanent magnet assembly 15 and asymmetry of phase winding caused by the occurrence of a difference in the number of coils constituting the phase winding to obtain a predetermined stroke length. Therefore, the increase/decrease in stroke can be effected in unit of one coil, and also smooth speed control can be achieved. Also, it is a matter of course that positioning control can also be carried out by adding a position control loop to the control block diagram shown in FIG. 5.

Figure 6:
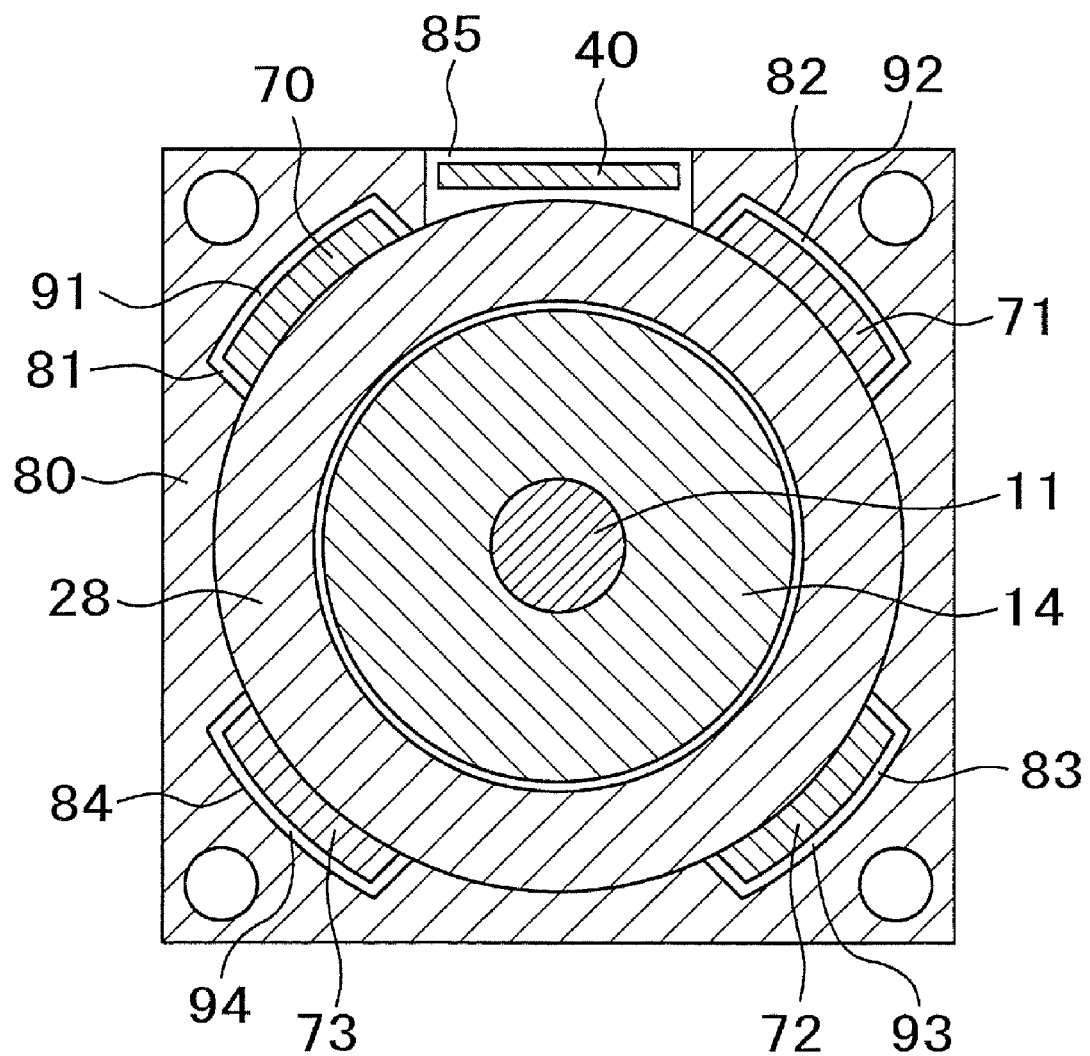
FIG. 6 is a transverse sectional view showing a modification of a cylinder-type linear motor in accordance with the present invention.

The aforementioned yoke member need not necessarily be of a cylindrical shape. As shown in a transverse sectional view of FIG. 6, slender plate-shaped yoke members 70, 71, 72 and 73 may be brought into contact with the outer peripheral surface of the coil assembly 28 at intervals in the circumferential direction. The yoke members 70, 71, 72 and 73 are installed so as to be inserted in spaces 91, 92, 93 and 94 formed between groove portions 81, 82, 83 and 84 parallel with the linear motion shaft 11, which are provided in the inner peripheral surface of an aluminum case 80, and the coil assembly 28, respectively. The aluminum case 80 is provided with an opening 85 that is long in the axial direction, and the circuit board 40 mounted with the sensor means 41 is disposed in the opening 85. In this case, by adjusting the ratio of the contact area with the aluminum case 80 to the contact area with the yoke members 70, 71, 72 and 73, the thrust can be increased while the heat radiation property is improved.

In the cylinder-type linear motor having the above-described moving part construction, for example, when the sensor means is a Hall element, since the output waveform of sensor means is proportional to the radial component of the magnetic flux density at a space position of the sensor means, the waveform becomes as indicated by a curve V in FIG. 4. Therefore, there arises a problem in that a system such that a zero cross point of the output waveform is detected to detect the magnetic pole position, which system having been used in the conventional brushless motor, cannot be used. For this reason, it is necessary to detect the moving part position by using storing means that stores the relationship between the output waveform and the moving part position in advance, which also presents the problem of a complicated circuit.

Figure 7:
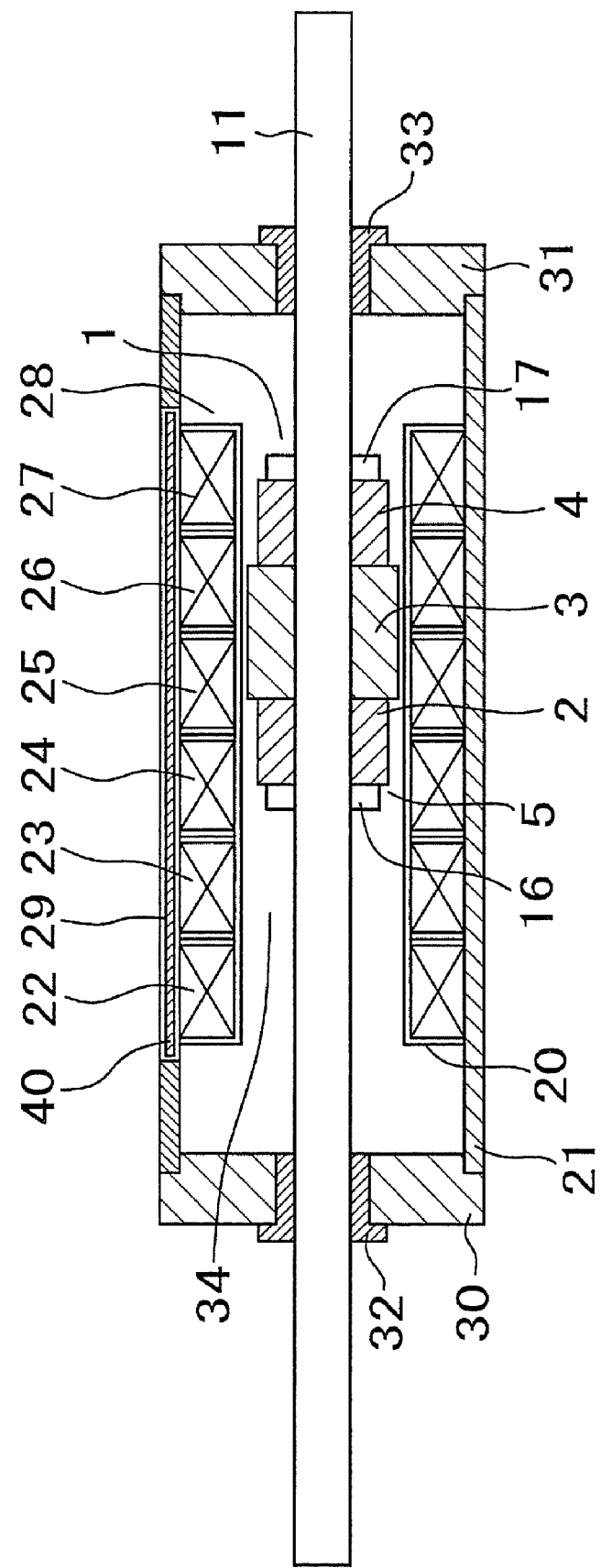
FIG. 7 is a longitudinal sectional view showing an embodiment of a moving part of a cylinder-type linear motor in accordance with the present invention.

FIG. 7 shows a cylinder-type linear motor in which the construction of moving part is changed. In FIG. 7, the same reference numerals are applied to elements that are the same as those in FIGS. 1 to 4, and explanation of those elements is omitted.

Figure 8:
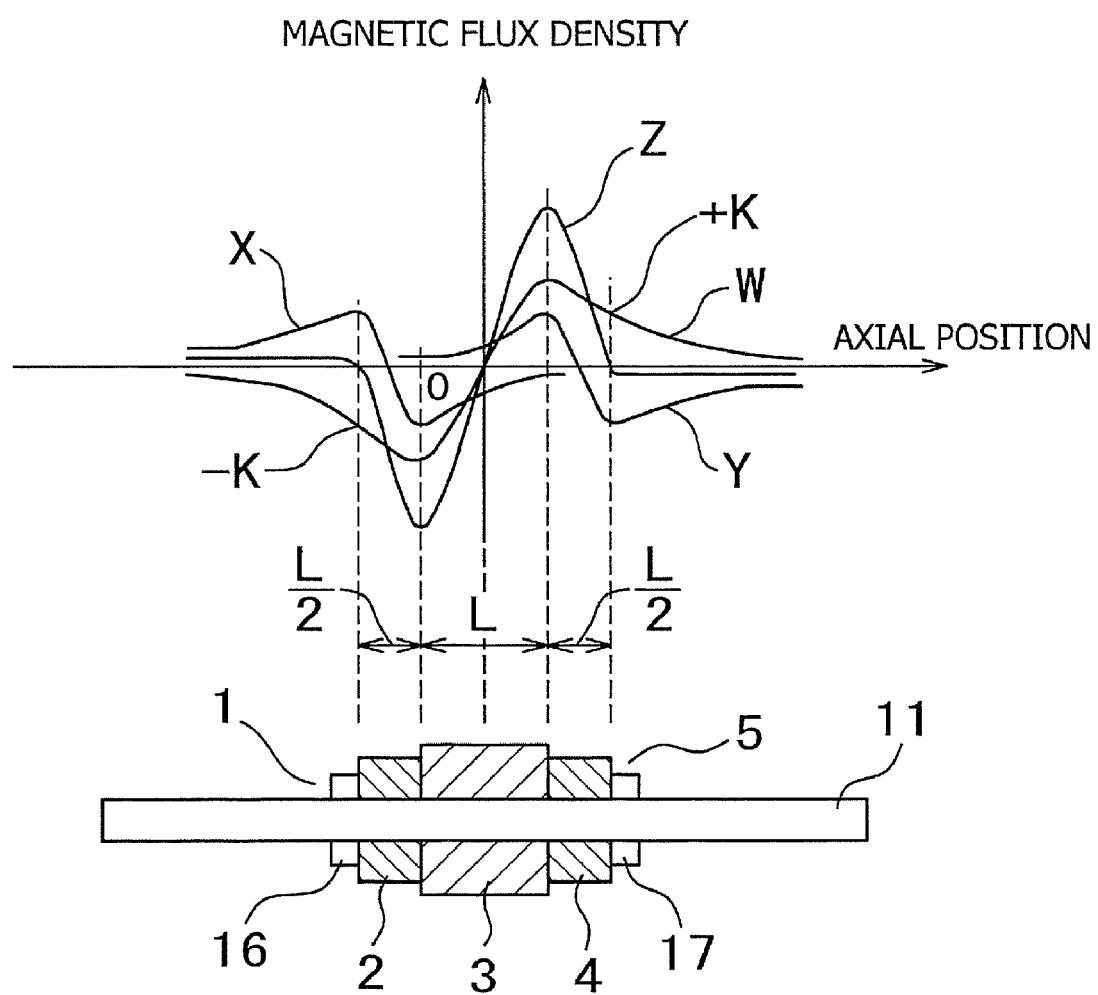
FIG. 8 is a schematic view showing an embodiment of a moving part of a cylinder-type linear motor in accordance with the present invention and a distribution curve.

FIG. 8 is a partial sectional view of FIG. 7, showing one embodiment of the moving part construction of the cylinder-type linear motor in accordance with the present invention, and a diagram showing magnetic flux density distribution waveforms of permanent magnets corresponding to the moving part construction and a composite waveform thereof. In this case, the central position in the axial direction of a first permanent magnet is the origin on the horizontal axis.

In FIGS. 7 and 8, a moving part 1 includes the linear motion shaft 11 reciprocating in the axial direction; a permanent magnet assembly 5 consisting of a first permanent magnet 3 magnetized in the first axial direction and second and third permanent magnets 2 and 4 magnetized in the direction opposite to the first axial direction, which are arranged on both sides of the first permanent magnet 3; and the fixing ring members 16 and 17 provided on both sides of the permanent magnet assembly 5.

On the other hand, the fixed part 20 both ends of which are supported by the brackets 30 and 31 is composed of the cylindrical yoke 21 made of a magnetic material, and the coil assembly 28 having the plurality of ring-shaped coils 22, 23, ..., 27 disposed in the axial direction with the equal pitch C. The coil assembly 28 is housed in the cylindrical yoke 21, and is formed with the cylindrical space 34 for containing the moving part 1 provided with the permanent magnet assembly 5 therein. The moving part 1 is arranged on the axis line of the cylindrical space 34, and is supported so as to reciprocate in the axial direction.

Also, the cylindrical yoke 21 is provided with the opening 29 extending in the axial direction, and the circuit board 40 having sensor means, not shown, for sensing the magnetic pole position of the moving part 1 is installed therein.

When the axial length of the first permanent magnet 3 is taken as L, the distribution waveform of magnetic flux density formed by the first permanent magnet 3 is represented by a curve W shown in FIG. 8. The peaks of magnetic flux density occur at the axial positions of ±L/2, and the magnetic pole pitch (distance between the N and S poles) P is equal to L. At this time, the magnetic flux density at the axial positions of ±L is not zero, but has a value of ±K as shown in FIG. 8. If the axial lengths of the second and third permanent magnets 2 and 4 are set at L/2 at this time, the magnetic flux distribution formed by the second permanent magnet 2 is represented by a curve X, the peaks thereof occurring at the axial positions of (−L) and (−L/2).

Also, the magnetic flux distribution formed by the third permanent magnet 4 is represented by a curve Y, the peaks thereof occurring at the axial positions of (L) and (L/2). If the outside diameters of the second and third permanent magnets 2 and 4 are made smaller than the outside diameter of the first permanent magnet 3, the cross-sectional areas of the second and third permanent magnets 2 and 4 become smaller than the cross-sectional area of the first permanent magnet 3. Further, the distance between the second and third permanent magnets 2 and 4 and the sensor means becomes longer than in the case of the first permanent magnet 3. By these two facts, the peak values of the second and third permanent magnets 2 and 4 can be made smaller than the peak values of the first permanent magnet 3, so that the outside diameters thereof can be adjusted so that the peak values are substantially close to the values of ±K.

The magnetic flux density distribution waveform synthesized by these three permanent magnets 2, 3 and 4 is represented by a curve Z shown in FIG. 8, namely, a waveform close to a sinusoidal wave distribution can be obtained. As a result, a magnetic pole position detecting system, which has been used in the conventional brushless motor, can be used.

The method for adjusting the peak values of magnetic flux density distribution of the second and third permanent magnets 2 and 4 is not merely to decrease the outside diameters of magnets as in the above-described embodiment, but may be to inversely increase the outside diameters depending to the space position of the sensor means. Also, as the method for changing the cross-sectional area, the inside diameters of the magnets may be changed. Alternatively, without changing the cross-sectional area, the materials of the second and third permanent magnets 2 and 4 may be changed to decrease or increase the energy products thereof as compared with the energy product of the first permanent magnet 3. Further, these three methods may be used combinedly.

Although an example in which the unit number of permanent magnet assemblies is one has been described in this embodiment, it is a matter of course that the unit number may be plural.

However, in the cylinder-type linear motor having the above-described moving part construction, as shown in FIG. 4, the magnetic flux density distribution near both end portions of the moving part assembly greatly deviates from a cosine waveform, so that the thrust characteristic is sometimes deteriorated. Also, there arises a problem in that the range in which the aforementioned approximate expression of $B(x)=B1\times\cos(\pi x/L)+B0$ can be applied is limited to the range of 2×L shown in the figure.

Figure 9:
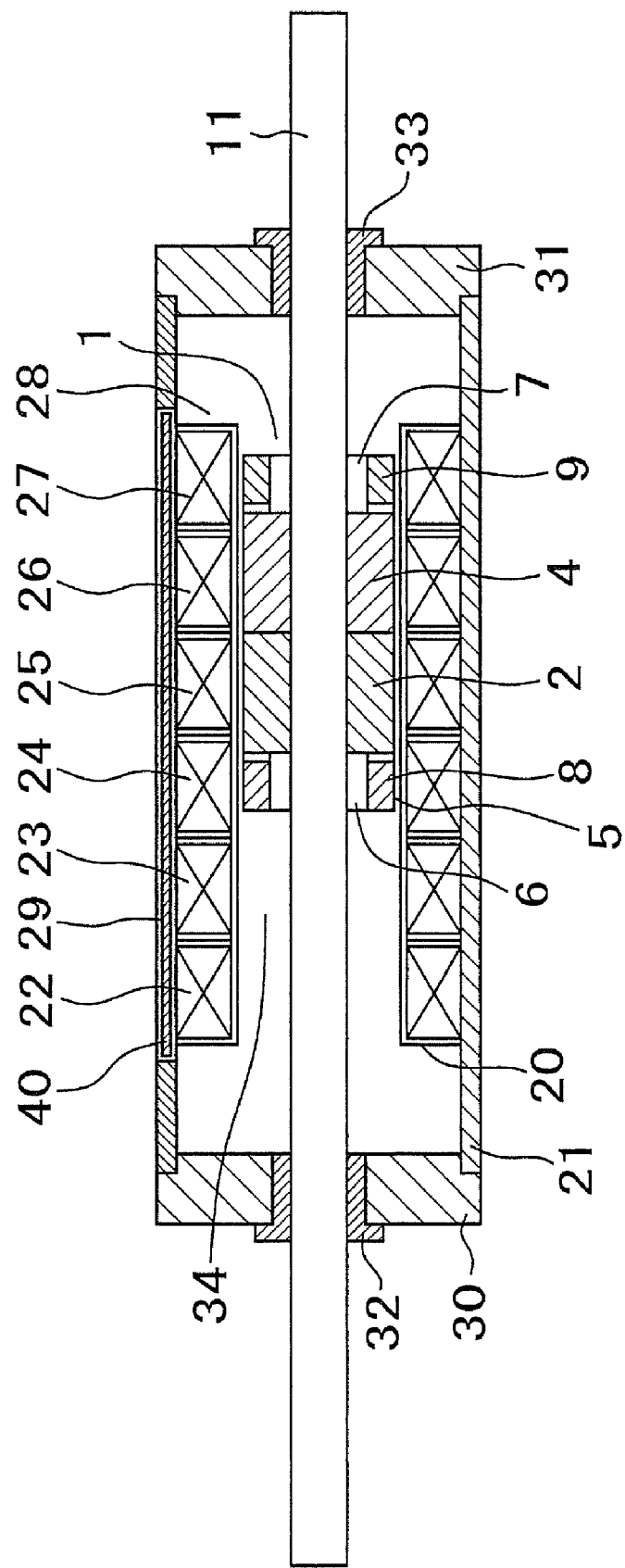
FIG. 9 is a longitudinal sectional view showing another embodiment of a moving part of a cylinder-type linear motor in accordance with the present invention.

FIG. 9 shows a moving part of the cylinder-type linear motor in accordance with the present invention, which can improve the magnetic flux density distribution waveform near both end portions of the moving part assembly by changing the construction of the moving part, and can improve the thrust characteristic by bringing the waveform closer to a cosine waveform and by increasing the amplitude of the cosine waveform. In FIG. 9, the same reference numerals are applied to elements that are the same as those in FIGS. 1 to 4, and explanation of those elements is omitted.

Figure 10:
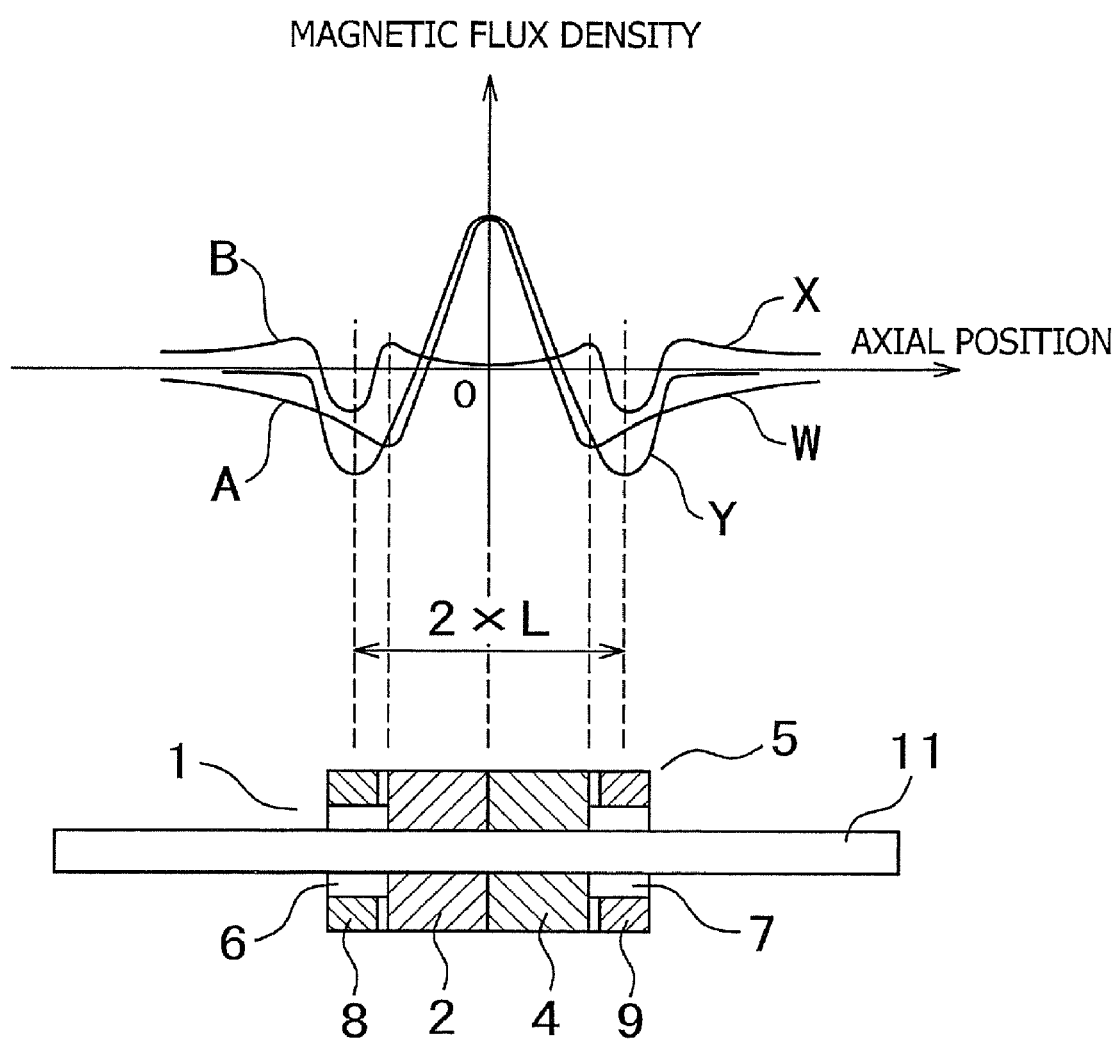
FIG. 10 is a schematic view showing another embodiment of a moving part of a cylinder-type linear motor in accordance with the present invention and a distribution curve.
Figure 11:
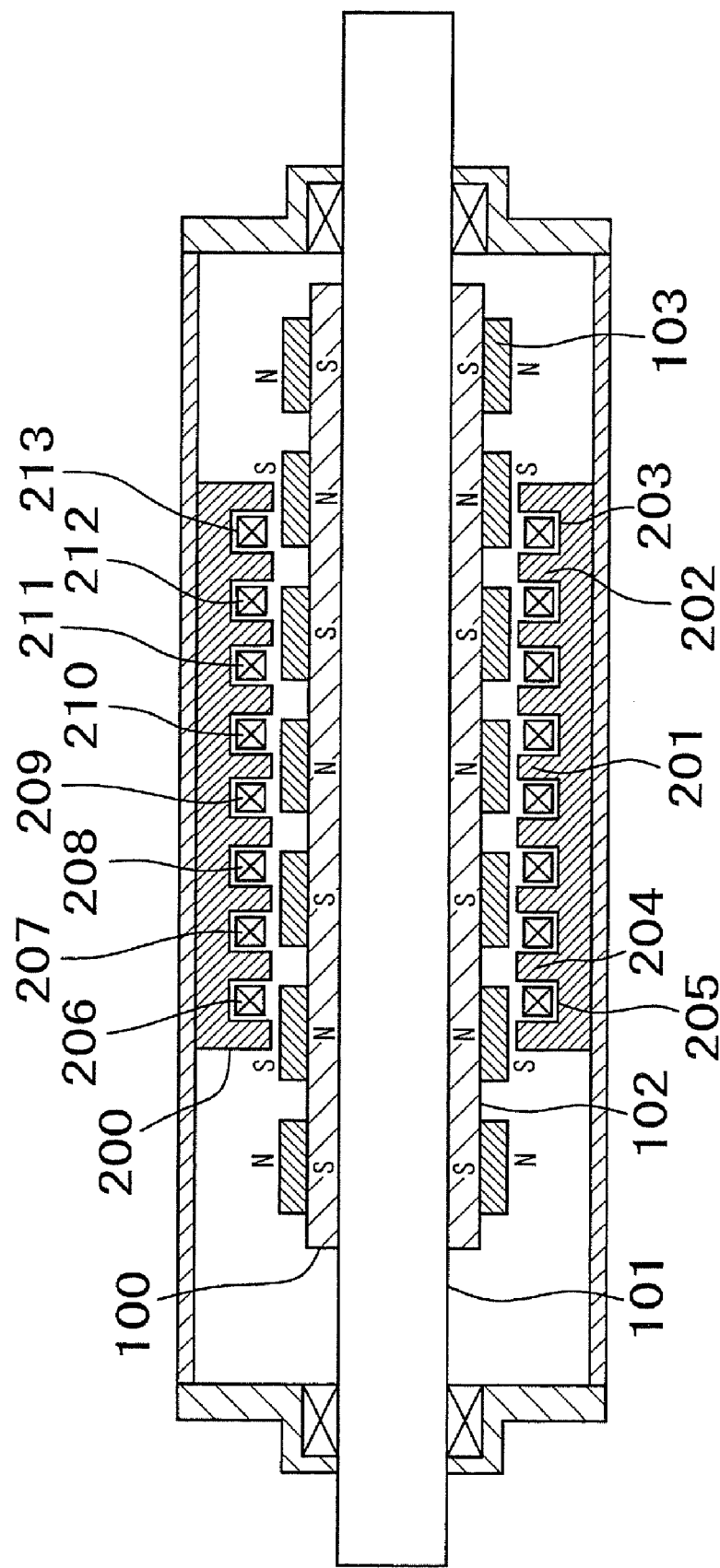
FIG. 11 is a longitudinal sectional view showing a conventional cylinder-type linear motor.

FIG. 10 is a partial sectional view of FIG. 9, showing one embodiment of the moving part of the cylinder-type linear motor in accordance with the present invention, and a diagram showing magnetic flux density distribution waveforms of permanent magnets corresponding to the moving part construction and a composite waveform thereof. In this case, the central position in the axial direction of the second and third permanent magnet is the origin on the horizontal axis.

In FIGS. 9 and 10, a moving part 1 includes the linear motion shaft 11 reciprocating in the axial direction; a pair of permanent magnets 2 and 4 consisting of the permanent magnet 2 magnetized in the axial direction (left to right) and the permanent magnet 4 magnetized in the opposite direction (right to left), which is arranged so as to face to the permanent magnet 2; the paired fixing ring members 6 and 7 which are brought into contact with both end faces of the paired permanent magnets 2 and 4 and are fixed on the linear motion shaft 11; a pair of ring-shaped permanent magnets 8 and 9 which are provided so as to be fitted on or brought into contact with the outer peripheral surfaces of the fixing ring members 6 and 7. The paired ring-shaped permanent magnets 8 and 9 are magnetized in the radial direction so that the polarity of outer peripheral surface is different from the polarity of the opposed surfaces of the paired permanent magnets 2 and 4. Also, the distance between the central positions of the axial length of the ring-shaped permanent magnets 8 and 9 is set at 2×L, and the outside diameters thereof are set so as to be equal to the outside diameters of the paired permanent magnets 2 and 4.

On the other hand, the fixed part 20, both ends of which are supported by the brackets 30 and 31, is composed of the cylindrical yoke 21 made of a magnetic material, and the coil assembly 28 having the plurality of ring-shaped coils 22, 23, . . . , 27 disposed in the axial direction with the equal pitch C. The coil assembly 28 is housed in the cylindrical yoke 21, and is formed with the cylindrical space 34 for containing the moving part 1 provided with the permanent magnet assembly 5 therein. The moving part 1 is arranged on the axis line of the cylindrical space 34, and is supported so as to reciprocate in the axial direction.

Also, the cylindrical yoke 21 is provided with the opening 29 extending in the axial direction, and the circuit board 40 having sensor means, not shown, for sensing the magnetic pole position of the moving part 1 is installed therein.

Since the moving part 1 is configured as described above, the distribution waveform of magnetic flux density formed by the paired permanent magnets 2 and 4 is represented by a curve W in FIG. 10, and the magnetic flux density distribution waveform formed by the paired ring-shaped permanent magnets 8 and 9 is represented by a curve X. If the values of magnetic density at point A of the curve W and at point B of the curve X are set so as to cancel each other, the synthesized magnetic flux density distribution waveform can be made a curve Y, and the magnetic flux density distribution waveform near both end portions of the permanent magnet assembly 5 can be brought closer to a cosine waveform.

The ring-shaped permanent magnets 8 and 9 are not limited to those formed into a cylindrical shape. Arc-shaped permanent magnets may be affixed to each other to form a ring shape. Also, an appropriate spacer may be interposed between the ring-shaped permanent magnet 8 and the permanent magnet 2, between the permanent magnet 2 and the permanent magnet 4, and between the permanent magnet 4 and the ring-shaped permanent magnet 9.

As the result of the above configuration, the construction shown in FIG. 9 can be achieved without changing the length of the moving part 1 including the fixing ring members 6 and 7 shown in FIG. 10, so that the characteristic can be improved without changing the length of the moving part.

The present invention is not limited to the above-described embodiments, and it is a matter of course that changes and modifications can be made appropriately without departing from the spirit and scope of the present invention.

The invention claimed is:

1. A moving part of a cylinder-type linear motor, comprising:
   a linear motion shaft which is arranged on an axis line of a cylindrical fixed part so as to reciprocate on the axis line in the axial direction; and
   a permanent magnet assembly which is provided on the linear motion shaft and is configured so that a plurality of permanent magnets magnetized in the axial direction are disposed so that the end faces thereof face each other, characterized in that:
      a unit is formed by a first permanent magnet magnetized in a first axial direction and second and third permanent magnets magnetized in the direction opposite to the first axial direction, which are arranged on both sides of the first permanent magnet;
      one or more units are arranged in series in the axial direction to form the permanent magnet assembly;
   wherein the first to third permanent magnets of the unit are arranged in the order of the second, first and third permanent magnets from the left, a distance between the left-hand side end face of the second permanent magnet and the right-hand side end face of the third permanent magnet is set at 2×L, and a distance between a first central position between the right-hand side end face of the second permanent magnet and the left-hand side end face of the first permanent magnet and a second central position between the right-hand side end face of the first permanent magnet and the left-hand side end face of the third permanent magnet is set at L, wherein the axial length of the first permanent magnet is L, and the axial lengths of the second and third permanent magnets each are L/2.

2. The moving part of a cylinder-type linear motor of claim 1, characterized in that the energy products of the second and third permanent magnets are equal to each other, and each are different from the energy product of the first permanent magnet.

3. The moving part of a cylinder-type motor of claim 1, wherein the permanent magnet assembly comprises a single unit of permanent magnets.

4. A moving part of a cylinder-type linear motor, comprising:
   a linear motion shaft which is arranged on an axis line of a cylindrical fixed part so as to reciprocate on the axis line in the axial direction; and
   a permanent magnet assembly which is provided on the linear motion shaft and is configured so that a plurality of permanent magnets magnetized in the axial direction are disposed so that the end faces thereof face each other, characterized in that:
      a unit is formed by a first permanent magnet magnetized in a first axial direction and second and third permanent magnets magnetized in the direction opposite to the first axial direction, which are arranged on both sides of the first permanent magnet;
      one or more units are arranged in series in the axial direction to form the permanent magnet assembly;
   wherein the first to third permanent magnets of the unit are arranged in the order of the second, first and third permanent magnets from the left, a distance between the left-hand side end face of the second permanent magnet and the right-hand side end face of the third permanent magnet is set at 2×L, and a distance between a first central position between the right-hand side end face of the second permanent magnet and the left-hand side end face of the first permanent magnet and a second central position between the right-hand side end face of the first permanent magnet and the left-hand side end face of the third permanent magnet is set at L, wherein the axial length of the first permanent magnet is L, and the axial lengths of the second and third permanent magnets each are L/2, and wherein the cross-sectional areas of the second and third permanent magnets are equal to each other, and each are different from the cross-sectional area of the first permanent magnet.

5. The moving part of a cylinder-type linear motor of claim 4, characterized in that the energy products of the second and third permanent magnets are equal to each other, and each are different from the energy product of the first permanent magnet.

6. The moving part of a cylinder-type motor of claim 4, wherein the cross sectional area of the second and third permanent magnet each are less than the cross sectional area of the first permanent magnet.

7. The moving part of a cylinder-type motor of claim 4, wherein the permanent magnet assembly comprises a single unit of permanent magnets.

8. The moving part of a cylinder-type motor of claim 4, wherein the permanent magnet assembly comprises a plurality of units of permanent magnets.

* * * * *

UNITED STATES PATENT AND TRADEMARK OFFICE
CERTIFICATE OF CORRECTION

| | | |
|---|---|---|
| PATENT NO. | : 7,989,994 B2 | Page 1 of 1 |
| APPLICATION NO. | : 12/098171 | |
| DATED | : August 2, 2011 | |
| INVENTOR(S) | : Iwasa et al. | |

It is certified that error appears in the above-identified patent and that said Letters Patent is hereby corrected as shown below:

In the Claims:

Column 11, Claim 1, Line 35: Please correct "magnet;" to read -- magnet; and --

Column 12, Claim 4, Line 19: Please correct "magnet;" to read -- magnet; and --

Signed and Sealed this
Sixth Day of December, 2011

David J. Kappos
*Director of the United States Patent and Trademark Office*